March 14, 1950     A. GREENFIELD     2,500,406
SUN VISOR FOR AUTOMOBILES
Filed Dec. 20, 1946     2 Sheets-Sheet 1
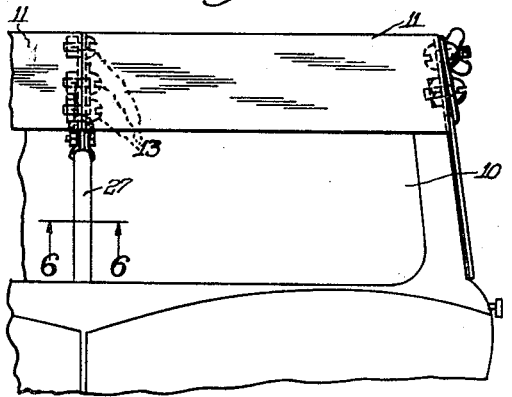
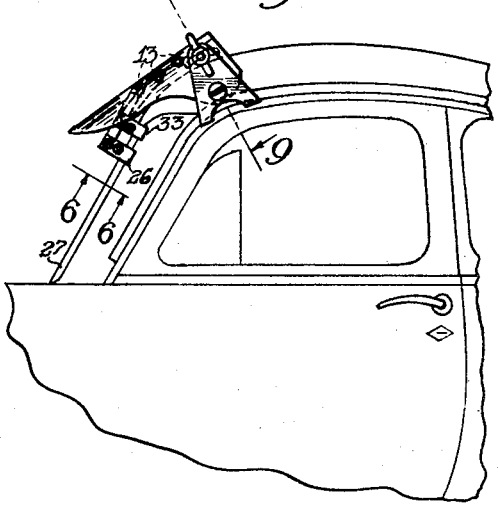
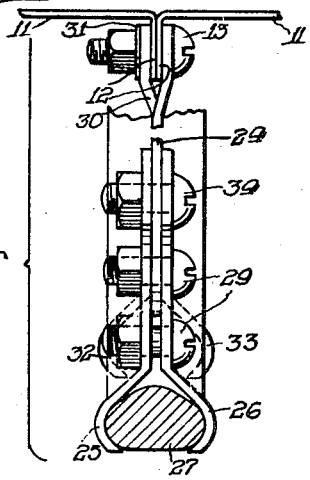
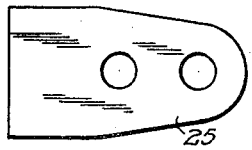
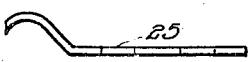
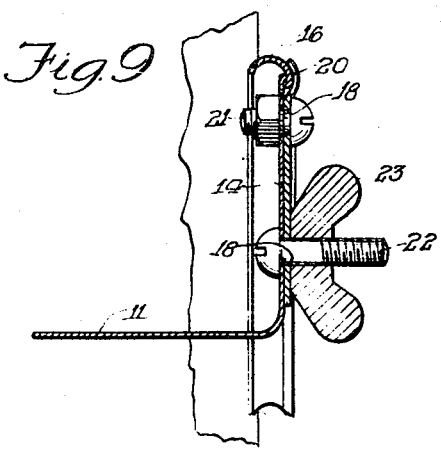
Inventor:
Alec Greenfield
By Henry Pech
Attorney March 14, 1950     A. GREENFIELD     2,500,406
SUN VISOR FOR AUTOMOBILES
Filed Dec. 20, 1946     2 Sheets-Sheet 2
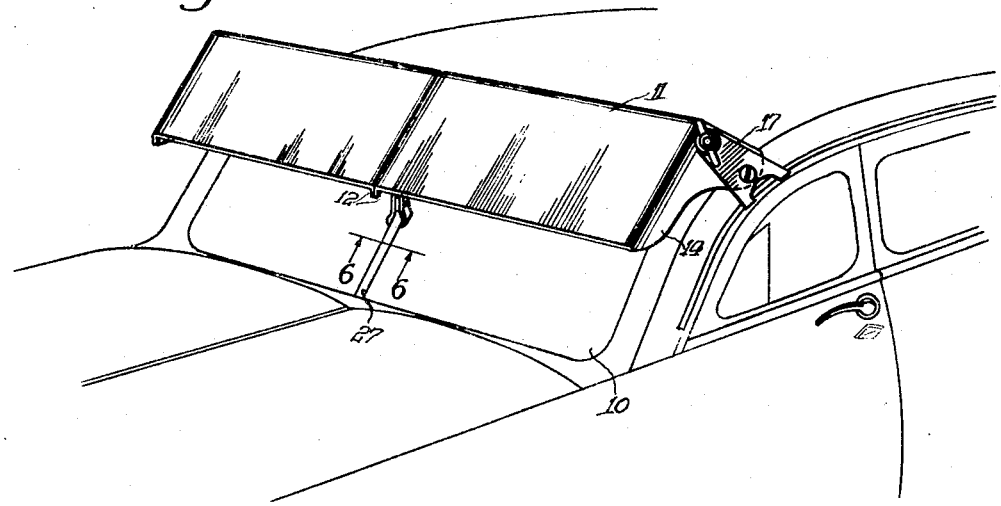
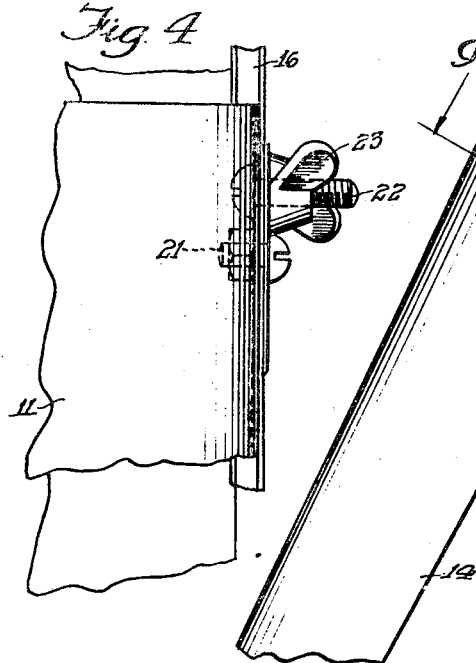
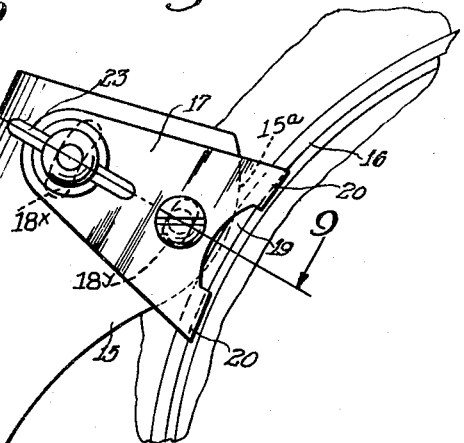
Inventor:
Alec Greenfield
By Henry Bloh
Attorney Patented Mar. 14, 1950

2,500,406

UNITED STATES PATENT OFFICE 2,500,406

SUN VISOR FOR AUTOMOBILES

Alec Greenfield, Chicago, Ill., assignor, by mesne assignments, to The Greenfield Company, Chicago, Ill., a copartnership composed of Alec Greenfield and Martin D. Greenfield Application December 20, 1946, Serial No. 717,518

4 Claims. (Cl. 296—95)

This invention pertains to sun visors for automobiles, and more particularly to the type which is adapted to be mounted in operative position relative to the present sloping style of windshield by attachment to the rain gutters.

Various types of windshield visors, and various attaching means therefor, have been proposed heretofore, the previously known devices, however, being objectionable from the standpoint of facility, or sturdiness, or even possibility, of installation as an auxiliary attachment for present-day styles of car.

The objects realized by the present improvements include: the provision of a simplified attaching means for visors of the class described, especially adapted to the situations where the visor may be installed as an auxiliary attachment to any of a diversity of styles of automobile by persons relatively unskilled in the use of tools; the simplification of the attaching means by having certain flange parts formed integrally with the visor panels; the provision of improvements in the construction and assembly of the visor by having the same formed in two sections with meeting flanges joined by screws; the provisions of a centerpost attaching means including certain brackets engaged with the aforesaid meeting-flange screws; the provision of bracket plates having concave feet to clamp onto the outside of the gutter; and the provision of certain arcuate configurations in the visor panel flanges permitting adjustability.

With the foregoing and other important objects in view, which will become apparent from a perusal of the disclosed invention, the latter comprises the means, structures, and functional disclosures set forth in the following specification, claims, and drawings, in which:

Fig. 1 is a partial front view of an automobile to which the invention has been applied;

Fig. 2 is a side view of the parts shown in Fig. 1;

Fig. 3 is a partial perspective view of the upper part of an automobile;

Fig. 4 is a partial top plan view of one end of the visor;

Fig. 5 is a side view of the parts shown in Fig. 4;

Fig. 6 is detail section on the line 6—6 of Figs. 1 or 2;

Figs. 7 and 8 are respectively plan view and side view of a clamping plate; and

Fig. 9 is a section on the line 9—9 of Figs. 2 or 5.

The visor is adapted to be supported above the windshield 10 of an automobile, and comprises two panels 11 of rectangular configuration, each of which is provided at its inner meeting edge with a downwardly bent flange 12.

The meeting flanges 12 are apertured at three places for the passage of bolts 13, whereby the panels are rigidly joined together, concomitantly with certain center-post bracket means to be described.

Each panel 11, at its outer edge, is formed to have an integral, downwardly extending bracket flange or arm 14 which is formed with an enlarged gutter-portion 15 having an arcuate edge 15a adapted to extend into the rain gutter 16.

To secure the flange bracket or arm portions 15—15a in mounted engagement with the rain gutters, there is provided a clamping plate 17 of substantially triangular configuration and provided with two apertures 18, one above another. At the lower edge of this plate 17 is a cut-away portion 19 providing spaced prongs or feet 20 having concave offset ends adapted to fit snugly against, and partially encompass the outer side of the gutter as shown in Fig. 9.

In addition to forming the feet 20, as aforesaid, the cut-away portion 19 permits visual inspection to ascertain whether the panel flange portions 15a are properly positioned in the gutters.

A screw 21 extends through the lower aperture 18 in the plate 17 and an aligned arcuate aperture 18y in the visor arm 14; and similarly a pivot screw 22 passes through the upper aperture 18 and an aligned aperture or pivot hole 18x in arm 14, and is provided with a wing nut 23. The arcuate edge on integral bracket gutter portion 15 is intentionally concentric with the pivot hole for the wing nut 22.

A link 24 apertured at the upper end is interposed between the head of the lowermost screw 13 and the adjacent panel and extends downwardly to be secured between clamping jaws 25 and 26 which encompass the center rod 27 of the windshield 28 and are secured together by screws 29.

Similarly a link 30 interposed between the washer 31 of the center screw 13 and the adjacent flange 12 extends downwardly to be secured between clamping jaws 32 and 33 encompassing the center rod of the windshield by screws 34.

From the foregoing it is obvious that the visor is supported at both ends by the integral bracket arms 14 which are clamped to the rain gutter 16 at each side of the automobile and above its door.

In order to adjust the visor the wing nut 23 is loosened as well as the screws 29 and 34 and after proper positioning of the visor the aforementioned nuts are tightened.

The support of the visor at both ends and at the center provides for rigidity and obviates any rattling or noise while driving.

While the drawings show one embodiment of the invention, numerous changes may be made.

I, therefore, do not limit myself to the precise details of construction or arrangement of parts, as shown, but include all changes, modifications and revisions constituting departures within the scope of the invention as defined by the appended claims.

I claim:

1. An automobile sun visor comprising a panel, a flange rigidly fastened on each end of the panel, each flange having a pivot hole, a portion of the outer edge of each flange following an arc with the hole as the center, a plate pivotally mounted on each hole, each of said plates extending adjacent the curved edge of its associated flange, whereby the curved edge of each flange may be inserted into an associated automobile top drain gutter and the gutter's projecting edge may be clamped between the plate and the flange, and means for clamping each plate to its associated flange.

2. An automobile sun visor comprising a panel, a down-turned integral flange on each end of the panel, and each flange having a pivot hole, a gutter portion of the outer edge of each flange following an arc with the hole as the center, a clamp plate pivotally mounted on each pivot hole, each of said plates extending beyond the curved edge of its associated flange and having a foot portion concave with respect to the curved edge, whereby when the curved edge of each flange is inserted into an associated automobile top drain gutter, the concave surface of the flange will engage the outer surface of the gutter's projecting edge, and means for clamping each plate to its associated flange to grip the gutter.

3. An automobile sun visor comprising a panel having an integral, depending flange at opposite sides thereof and each flange having a pivot hole, a portion of the outer edge of each said flange following an arc with the hole as the center, a plate for each said flange pivotally joined thereto by a pivot bolt through each corresponding pivot hole, each of said plates having a generally triangular configuration with the hole by which it is joined to its associated flange near one apex, a foot at each of the other two apex portions and each foot having a surface concave on the side of the curved edge of its associated flange and spaced radially from the edge by a distance such that the thickness of metal of an automobile top drain gutter may be readily positioned between the flange and the concave feet of the plate, and means for clamping each plate to its associated flange.

4. An automobile sun visor comprising an elongated panel, an integral, downturned mounting flange at each end of said panel, each said flange having an arcuate edge portion adapted to be received on the inner side of an automobile top gutter, and clamp means for each said flange including a clamp member bolted to the corresponding flanges and each having a concave foot portion fitting onto the outside of the gutter to clamp the latter cooperably with the corresponding flange.

ALEC GREENFIELD.

REFERENCES CITED

The following references are of record in the file of this patent:

UNITED STATES PATENTS

| Number | Name | Date |
|---|---|---|
| 1,644,662 | Anderson | Oct. 11, 1927 |
| 1,697,808 | Boca | Jan. 1, 1929 |
| 2,334,856 | Atkinson | Nov. 23, 1943 |